United States Patent [19]

Diaz

[11] 4,368,178
[45] Jan. 11, 1983

[54] PROCESS FOR THE REMOVAL OF $H_2S$ AND $CO_2$ FROM GASEOUS STREAMS

[75] Inventor: Zaida Diaz, Houston, Tex.

[73] Assignee: Shell Oil Company, Houston, Tex.

[21] Appl. No.: 267,181

[22] Filed: May 26, 1981

[51] Int. Cl.³ .................. B01D 53/34; C01B 17/04
[52] U.S. Cl. .................................. 423/226; 423/224; 423/573 G
[58] Field of Search .............. 423/224, 226, 222, 573, 423/575, 578

[56] References Cited

U.S. PATENT DOCUMENTS

| | | | |
|---|---|---|---|
| 2,881,047 | 4/1959 | Townsend | 423/575 X |
| 3,068,065 | 12/1962 | Hartley et al. | 423/228 |
| 3,266,320 | 12/1965 | Meuly et al. | 423/224 X |
| 3,516,793 | 6/1970 | Renault | 423/573 |
| 3,622,273 | 11/1971 | Roberts et al. | 423/226 |
| 3,933,993 | 1/1976 | Salemme | 423/226 X |
| 4,009,251 | 2/1977 | Meuly | 423/573 |
| 4,091,073 | 5/1978 | Winkler | 423/226 |

Primary Examiner—Earl C. Thomas
Attorney, Agent, or Firm—Albert J. Adamcik

[57] ABSTRACT

A cyclic process for the simultaneous removal of hydrogen sulfide and carbon dioxide from a variety of gas streams is disclosed. The gas stream containing the sour gases is contacted with a solution of the Fe(III) chelate of nitrilotriacetic acid in an absorbent comprising diethylene glycol monoethyl ether. The hydrogen sulfide is converted to sulfur, the $CO_2$ is absorbed to produce a purified gas stream, and the Fe(III) chelate is converted to the Fe(II) chelate. The process includes sulfur removal and regeneration of the absorbent and the Fe(III) chelate.

24 Claims, 1 Drawing Figure

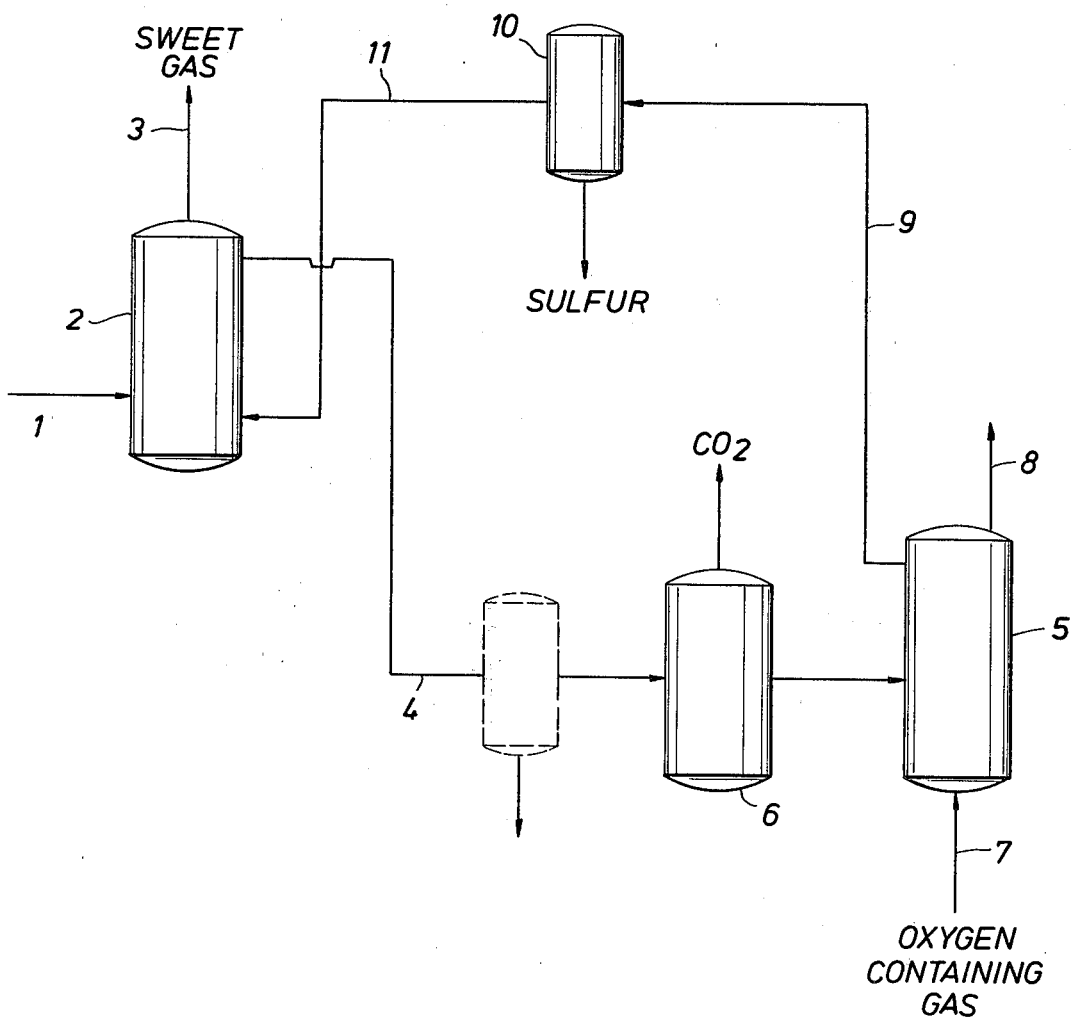

PROCESS FOR THE REMOVAL OF H₂S AND CO₂ FROM GASEOUS STREAMS

BACKGROUND OF THE INVENTION

The presence of significant quantities of $H_2S$ and $CO_2$ in various "sour" industrial gaseous streams poses a persistant problem. Although various procedures have been developed to remove and recover these contaminants, most such processes are unattractive for a variety of reasons. Accordingly, there remains a need for an efficient and low cost process to remove these undesired materials.

While some work has been done in the area of removal and conversion of $H_2S$ to sulfur by use of iron complexes in waste gas streams, such processes generally are inapplicable directly to purification of hydrocarbon feedstock, coal gasification, or natural gas streams having high ratios of $CO_2$ to $H_2S$. For example, U.S. Pat. No. 3,266,320 (Meuly, et al.) discloses the removal of $H_2S$ from fluids passing through or leaving industrial process by adding to the polluted streams certain chelates of polyvalent metals. The chelates are added in an amount which is stoichiometrically substantially less than the amount of the pollutant, and the chelate- and pollutant-containing stream is contacted with oxygen. The preferred chelates are the iron, cobalt, and nickel chelates of acetyl acetone, cyclopentadiene, ethylene diamine tetraacetic acid, N-hydroxyethyl ethylene diamine triactic acid, gluconic acid, tartaric acid and citric acid. The chelate is said to catalyze the reaction.

As indicated, however, this procedure is unsuited to gaseous hydrocarbon feedstock, coal gasification stream, or natural gas treatment since no provision is made for $CO_2$ removal. More importantly, the use of oxygen with the materials contemplated would be intolerable. Finally, the amounts of chelate employed in the patent are merely catalytic, and do not give the desired degree of $H_2S$ removal from gaseous streams.

Similarly, U.S. Pat. No. 3,622,273 (Roberts and Johnson) discloses the removal of $H_2S$ from a gaseous stream by contacting the gaseous stream with a solution containing, by weight, from 0.005 to 20 percent of a ferric ion complex, from 25.0 to 99.945 percent of water, and from 0.05 to 10.0 percent of a buffering agent selected from the group consisting of alkali metal carbonate and alkali metal bicarbonate. According to the patentees, known complexing agents, such as nitrilotriacetic acid and ethylene diamine tetraacetic acid, present stability problems when employed in $H_2S$ removal. To overcome these problems, the patentees specify the addition of a buffer to the treating solution, in the amount and type indicated previously. The ferrous complex resulting from reaction of the ferric complex with the $H_2S$ may be regenerated in a separate zone and reused indefinitely.

U.S. Pat. No. 4,091,073 to Winkler describes a process in which $H_2S$ and $CO_2$ are simultaneously removed from a variety of gas streams. The gas stream containing the sour gases is contacted with a solution of the Fe(III) chelate of N-(2-hydroxyethyl)ethylene diamine triacetic acid in a $CO_2$-selective solvent. The hydrogen sulfide is converted to sulfur, the $CO_2$ is absorbed to produce a purified gas stream, and the Fe(III) chelate is converted to the Fe(II) chelate. The process includes sulfur removal and simultaneous regeneration of the solvent and the Fe(III) chelate.

Nonetheless, there remains a need for an economical and efficient method of $H_2S$ and $CO_2$ removal. The present invention satisfies that need.

SUMMARY OF THE INVENTION

Accordingly, the present invention is directed to a process for the separation of $H_2S$ and $CO_2$ from gaseous streams by use of a selective absorbent, and a reactant for converting the $H_2S$ to sulfur. More particularly, the invention is directed to a process for the removal of $H_2S$ and $CO_2$ from gaseous streams, such as streams derived from coal gasification or liquefaction, synthesis gas streams, and various hydrocarbon streams, such as refinery feedstocks and natural gas, by selectively absorbing the $CO_2$ in a specific organic solvent, and concomitantly converting the $H_2S$ to sulfur. Broadly, this is accomplished by contacting the "sour" gaseous stream with an absorbent mixture containing a specific selective absorbent for $CO_2$ (and preferably $H_2S$ as well), diethylene glycol monoethyl ether, and an effective amount of the Fe(III) chelate of nitrilotriacetic acid. A purified or "sweet" gaseous stream is produced which meets general industrial and commercial $H_2S$ and $CO_2$ specifications. The $CO_2$ is absorbed and the $H_2S$ is immediately converted to sulfur by the Fe(III) chelate of nitrilotriacetic acid. In the process, the Fe(III) chelate is reduced to the Fe(II) chelate. The invention also provides for the regeneration of the Fe(II) chelate of nitrilo-triacetic acid, for release of the absorbed $CO_2$, and for the removal of the sulfur from the absorbent mixture. If significant quantities of $CO_2$ have been absorbed, the reactant-containing solution is preferably stripped, such as by heating or pressure reduction, to remove the bulk of the $CO_2$ before regeneration of the reactant (either prior or subsequent to sulfur removal). Alternately, or if small quantities of $CO_2$ are absorbed, the $CO_2$ may simply be stripped in the regeneration zone. The regenerated absorbent mixture may then be returned for further use.

The particular type of gaseous stream treated is not critical, as will be evident to those skilled in the art. Streams particularly suited to removal of $H_2S$ and $CO_2$ by the practice of the invention are, as indicated, naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, and other gaseous hydrocarbon streams. The term "hydrocarbon stream(s)", as employed herein, is intended to include streams containing significant quantities of hydrocarbon (both paraffinic acid aromatic), it being recognized that such streams containing significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. $CO_2$ content may also vary, and may range from about 0.5 percent to over 99 percent by volume. Obviously, the amounts of $H_2S$ and $CO_2$ present are not generally a limiting factor in the practice of the invention.

The temperatures employed in the absorption zone are not generally critical, except in the sense that the temperatures employed must permit acceptable absorption of $CO_2$. In general, temperatures from 10° C. to 80° C. are suitable, and temperatures from 20° C. to 45° C. are preferred. In many commercial applications, such as the removal of $H_2S$ and $CO_2$ from natural gas to meet pipeline specifications, contacting at ambient temperatures is preferred, since the cost of refrigeration would exceed the benefits obtained due to increased absorption at the lower temperature. Contact times may range from about 1 second to about 270 seconds or longer, with contact times of 2 seconds to 120 seconds being preferred.

Similarly, in the regeneration or stripping zone or zones, temperatures may be varied widely. Preferably, the regeneration zone should be maintained at substantially the same temperature as the absorption zone. If heat is added to assist regeneration, cooling of the absorbent mixture is required before return of the absorbent mixture to the absorption zone. In general, temperatures of from about 10° C. to 80° C., preferably 20° C. to 45° C. may be employed.

Pressure conditions in the absorption zone may vary widely, depending on the pressure of the gas to be treated. For example, pressures in the absorption zone may vary from one atmosphere up to one hundred fifty or even two hundred atmospheres. Pressures of from one atmosphere to about one hundred atmospheres are preferred. In the regeneration or desorption zone or zones, pressures will range from about one atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al., dated Dec. 11, 1962, and U.S. Pat. No. 4,009,251, to Meuly, issued Feb. 22, 1977, which disclosures are incorporated herein by reference. Preferably, pH in the process of the invention will range from about 6 to about 7.5. The process is preferably conducted continuously, and the molar ratio of the nitrilotriacetic acid to the iron is from about 1.2 to 1.4.

As indicated, the $H_2S$, when contacted, is quickly converted by the Fe(III) chelate of nitrilotriacetic acid to elemental sulfur. Since the Fe(III) chelate (and the Fe(II) chelate) has limited solubility in many solvents or absorbents, it is a real advantage of the invention that the chelate has good solubility in the absorbent of the invention, diethylene glycol monoethyl ether (Carbitol). The chelate is preferably supplied in admixture with the liquid absorbent and water. The amount of chelate supplied is that amount sufficient to convert all or substantially all of the $H_2S$ in the gas stream, and will generally be on the order of at least about two mols per mol of $H_2S$. Ratios of from about 2 mols to about 15 mols of chelate per mol of $H_2S$ may be used, with ratios of from about 2 mols per mol to about 5 mols of chelate per mol of $H_2S$ being preferred. The manner of preparing the admixture is a matter of choice. Preferably, the chelate is added as an aqueous solution to the liquid absorbent. Since the chelate has significant solubility in the absorbent, and since water is produced by the reaction of the $H_2S$ and the chelate, precise amounts of water to be added cannot be given. In general, the amount of chelate solution supplied may be about 20 percent to about 80 percent by volume of the total absorbent admixture supplied to the absorption zone. The Fe(III) chelate solution will generally be supplied as an aqueous solution having a concentration of from about 0.1 molar to about 1.5 molar. A composition of about 1 molar is preferred.

The loaded absorbent mixture is regenerated by contacting the mixture in a regeneration zone or zones, with oxygen. As used herein, the term "oxygen" includes oxygen-containing gases, such as air or air-enriched with oxygen. The oxygen accomplishes two functions, the stripping of any residual $CO_2$ from the loaded absorbent mixture and the oxidation of the Fe(II) chelate of nitrilotriacetic acid to the Fe(III) chelate of nitrilo triacetic acid. The oxygen (in whatever form supplied) is supplied in a stoichiometric equivalent or excess with respect to the amount of Fe(II) chelate present in the mixture. Preferably, the oxygen gas is supplied in an amount of from about 1.2 to 3 times excess.

As indicated, a critical feature of the invention is the use of diethylene glycol monoethyl ether as the absorbent liquid. The solvent need not be pure, and, in general, will contain minor amounts of other materials. The use of this absorbent provides a system which can be virtually non-aqueous, has a high $H_2S$ and $CO_2$ capacity, and has a low vapor pressure at typical operating temperatures. Additionally, the solutions exhibit good $CO_2$ selectivities and produce high quality sulfur crystals which settle readily. Sulfur removal from solution may be accomplished by means such as extraction, liquid flotation, filtration, or use of a hydroclone, etc.

In order to describe the invention in greater detail, reference is made to the accompanying drawing. The values given herein relating to temperatures, pressures, compositions, etc., should be considered merely exemplary and not as delimiting the invention.

As shown, sour gas, e.g., natural gas containing about 0.5 percent $H_2S$, and 32 percent by volume $CO_2$ in line 1 enters absorption column 2 (tray type) into which also enters an absorbent mixture composed of 90 percent diethylene glycol monoethyl ether (by volume) and 10 percent of an aqueous 0.8 M solution of the Fe(III) chelate of nitrilotriacetic acid. The pressure of the feed gas is about 1200 p.s.i.g., and the temperature of the absorbent mixture is about 45° C. A contact time of about 45 seconds is employed in order to absorb virtually all $CO_2$ and react all the $H_2S$. Purified or "sweet" gas leaves absorption column 2 through line 3. The "sweet" gas is of a purity sufficient to meet standard requirements. In the absorbent mixture, the $H_2S$ is converted to elemental sulfur by the Fe(III) chelate, the Fe(III) chelate in the process being converted to the Fe(II) chelate. The absorbent mixture, containing the elemental sulfur, absorbed $CO_2$ and the Fe(II) chelate, is removed continuously and sent through line 4 to regeneration zone 5. Prior to entry to zone 5, the sulfur in the absorbent mixture may be removed in a sulfur separation zone (shown in dotted lines). However, sulfur recovery may also be accomplished at a later stage, as shown hereinafter. As shown, the bulk of the $CO_2$ absorbed is removed in unit 6 by reduction of pressure. Heat may be added, if necessary. Any absorbent carried over with the vented $CO_2$ may be recovered by conventional equipment, such as a carbon absorption bed (not shown), and recycled.

In regeneration zone 5 the loaded absorbent mixture is contacted with excess air in line 7 to strip the remaining $CO_2$ from the mixture and convert the Fe(II) chelate to the Fe(III) chelate. The temperature of the stripping column is about 45° C., and pressure in the column is maintained at about 2 atmospheres. Spent air is removed from column 5 through line 8, while regenerated absorbent mixture, which still contains elemental sulfur, is sent through line 9 to sulfur removal zone 10. In unit 10, which may be a settler, the sulfur is removed from the absorbent mixture and recovered. The now fully regenerated absorbent mixture is returned via line 11 to absorption zone 2.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, an absorption column comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which may be beneficial.

What is claimed is:

1. A process for the removal of $H_2S$ and $CO_2$ from a sour gaseous stream comprising:
   (a) contacting the sour gaseous stream in a contact zone with a lean $CO_2$-selective liquid absorbent mixture comprising diethylene glycol monoethyl ether and an effective amount of the Fe(III) chelate of nitrilotriacetic acid, and producing a sweet gaseous stream and a liquid absorbent admixture containing absorbed $CO_2$, solid sulfur, and Fe(II) chelate of nitrilotriacetic acid,
   (b) removing sulfur from said absorbent admixture, and leaving a solution containing absorbed $CO_2$ and Fe(II) chelate of nitrilotriacetic acid,
   (c) stripping the solution containing absorbed $CO_2$ and said Fe(II) chelate, and regenerating Fe(III) chelate of nitrilotriacetic acid in said solution with oxygen, producing a lean $CO_2$-selective absorbent solution containing the Fe(III) chelate of nitrilotriacetic acid, and
   (d) returning lean $CO_2$-selective absorbent solution containing Fe(III) chelate of nitrilotriacetic acid to the contacting zone.

2. The method of claim 1 wherein the stream from which the $H_2S$ and $CO_2$ are removed is selected from naturally occurring gases, synthesis gases, process gases, and fuel gases.

3. The method of claim 2 wherein the sour gaseous stream is a stream derived from the gasification and partial oxidation of a liquid hydrocarbon.

4. The process of claim 2 wherein heat is supplied in step (c) to assist in regeneration.

5. The method of claim 2 wherein the stream from which the $H_2S$ and $CO_2$ are removed is a fuel gas stream produced by gasification of a material selected from coal, petroleum, oil shale, or tar sands.

6. The method of claim 5 wherein the sour gaseous stream is a stream derived from the gasification of coal.

7. A process for the removal of $H_2S$ and $CO_2$ from a sour gaseous stream comprising:
   (a) contacting the sour gaseous stream in a contacting zone with a lean $CO_2$-selective liquid absorbent mixture comprising diethylene glycol monoethyl ether and an effective amount of the Fe(III) chelate of nitrilotriacetic acid, and producing a sweet gaseous stream and a liquid absorbent admixture containing absorbed $CO_2$, solid sulfur, and Fe(II) chelate of nitrilotriacetic acid,
   (b) stripping said admixture containing absorbed $CO_2$, sulfur, and said Fe(II) chelate to remove $CO_2$, and then regenerating the Fe(III) chelate of nitrilotriacetic acid in said admixture with oxygen, producing a lean $CO_2$-selective absorbent solution containing the Fe(III) chelate of nitrilotriacetic acid, and sulfur,
   (c) removing sulfur from the lean $CO_2$-selective absorbent solution containing the sulfur and the Fe(III) chelate of nitrilotriacetic acid, and leaving a lean $CO_2$-selective absorbent solution containing the Fe(III) chelate of nitrilotriacetic acid, and
   (d) returning lean $CO_2$-selective absorbent solution containing the Fe(III) chelate of nitrilotriacetic acid to the contacting zone.

8. The method of claim 7 wherein the stream from which the $H_2S$ and $CO_2$ are removed is selected from naturally occurring gases, synthesis gases, process gases, and fuel gases.

9. The process of claim 8 wherein heat is supplied in step (b) to assist in regeneration.

10. The method of claim 8 wherein the sour gaseous stream is a stream derived from the gasification and partial oxidation of a liquid hydrocarbon.

11. The method of claim 8 wherein the stream from which the $H_2S$ and $CO_2$ are removed is a fuel gas stream produced by gasification of a material selected from coal, petroleum, oil shale, or tar sands.

12. The method of claim 11 wherein the sour gaseous stream is a stream derived from the gasification coal.

13. A process for the removal of $H_2S$ and $CO_2$ from a sour gaseous stream comprising:
   (a) contacting the sour gaseous stream in a contacting zone with a lean $CO_2$-selective liquid absorbent mixture comprising diethylene glycol monoethyl ether and an effective amount of the Fe(III) chelate of nitrilotriacetic acid, and producing a sweet gaseous stream and a liquid absorbent admixture containing absorbed $CO_2$, solid sulfur, and Fe(II) chelate of nitrilotriacetic acid,
   (b) removing sulfur from said absorbent admixture, and leaving a solution containing absorbed $CO_2$ and Fe(II) chelate of nitrilotriacetic acid,
   (c) stripping the solution containing absorbed $CO_2$ and said Fe(II) chelate and regenerating the Fe(III) chelate of nitrilotriacetic acid in said solution with oxygen, producing a lean $CO_2$-selective absorbent solution containing the Fe(III) chelate of nitrilotriacetic acid, and
   (d) returning lean $CO_2$-selective absorbent solution containing the Fe(III) chelate of nitrilotriacetic acid to the contacting zone.

14. The method of claim 13 wherein the stream from which the $H_2S$ and $CO_2$ are removed is selected from naturally occurring gases, synthesis gases, process gases, and fuel gases.

15. The method of claim 14 wherein the sour gaseous stream is a stream derived from the gasification and partial oxidation of a liquid hydrocarbon.

16. The process of claim 14 wherein heat is supplied in step (c) to assist in regeneration.

17. The method of claim 14 wherein the stream from which the $H_2S$ and $CO_2$ are removed is a fuel gas stream produced by gasification of a material selected from coal, petroleum, oil shale, or tar sand.

18. The method of claim 17 wherein the sour gaseous stream is a stream derived from the gasification of coal.

19. A process for the removal of $H_2S$ and $CO_2$ from a sour gaseous stream comprising:
  (a) contacting the sour gaseous stream in a contacting zone with a lean $CO_2$-selective liquid absorbent mixture comprising diethylene glycol monoethyl ether and an effective amount of the Fe(III) chelate of nitrilotriacetic acid, and producing a sweet gaseous stream and a liquid absorbent admixture containing absorbed $CO_2$, solid sulfur, and the Fe(II) chelate of nitrilotriacetic acid,
  (b) stripping said admixture containing absorbed $CO_2$, sulfur and said Fe(II) chelate and regenerating the Fe(III) chelate of nitrilotriacetic acid in said admixture with oxygen, producing a lean $CO_2$-selective absorbent solution containing the Fe(III) chelate of nitrilotriacetic acid, and sulfur,
  (c) removing sulfur from the lean $CO_2$-selective absorbent solution containing the sulfur and the Fe(III) chelate of nitrilotriacetic acid, and leaving a lean $CO_2$-selective absorbent solution containing the Fe(III) chelate of nitrilotriacetic acid, and
  (d) returning lean $CO_2$-selective absorbent solution containing the Fe(III) chelate of nitrilotriacetic acid to the contacting zone.

20. The method of claim 19 wherein the stream from which the $H_2S$ and $CO_2$ are removed is selected from naturally occurring gases, synthesis gases, process gases, and fuel gases.

21. The process of claim 20 wherein heat is supplied in step (b) to assist in regeneration.

22. The method of claim 20 wherein the sour gaseous stream is a stream derived from the gasification and partial oxidation of a liquid hydrocarbon.

23. The method of claim 20 wherein the stream from which the $H_2S$ and $CO_2$ are removed is a fuel gas stream produced by gasification of a material selected from coal, petroleum, oil shale, or tar sands.

24. The method of claim 23 wherein the sour gaseous stream is derived from the gasification coal.

* * * * *